No. 12,415. REISSUED DEC. 5, 1905.

E. E. FLORA.

INCANDESCENT OIL LAMP.

APPLICATION FILED SEPT. 29, 1904.

Witnesses:
Chas. E. Gaylord.
John Enders.

Inventor:
Ellsworth E. Flora,
By Dyrenforth, Dyrenforth & Lee,
Attys.

UNITED STATES PATENT OFFICE.

ELLSWORTH E. FLORA, OF CHICAGO, ILLINOIS, ASSIGNOR, BY MESNE ASSIGNMENTS, TO FLORA BURNER AND LAMP COMPANY, OF CHICAGO, ILLINOIS, A CORPORATION OF ILLINOIS.

INCANDESCENT OIL-LAMP.

No. 12,415. Specification of Reissued Letters Patent. Reissued Dec. 5, 1905.

Original No. 711,153, dated October 14, 1902. Application for reissue filed September 29, 1904. Serial No. 226,569.

*To all whom it may concern:*

Be it known that I, ELLSWORTH E. FLORA, a citizen of the United States, residing at Chicago, in the county of Cook and State of Illinois, have invented new and useful Improvements in Incandescent Oil-Lamps, of which the following is a specification.

My object is to provide an oil-burning incandescent lamp of improved construction in the use of which comparatively great illuminating power may be obtained at a minimum expense of hydrocarbon oil and wherein oil of the grade usually employed in kerosene-lamps may be used without danger of offensive odor and without rapid wear of the wick.

In carrying out my invention I employ an annular burner surmounted by an incandescent hood or mantle and having an oil-conducting wick, all so arranged that the oil from the wick is gasified by the heat of the burner, then mixed with air, and then discharged and ignited in the mantle, whereby a single blue flame, the result of substantially perfect combustion, is produced far enough away from the wick to avoid rapid charring of the same and of a volume and intensity which renders the hood or mantle employed incandescent throughout a large portion thereof.

Figure 1:
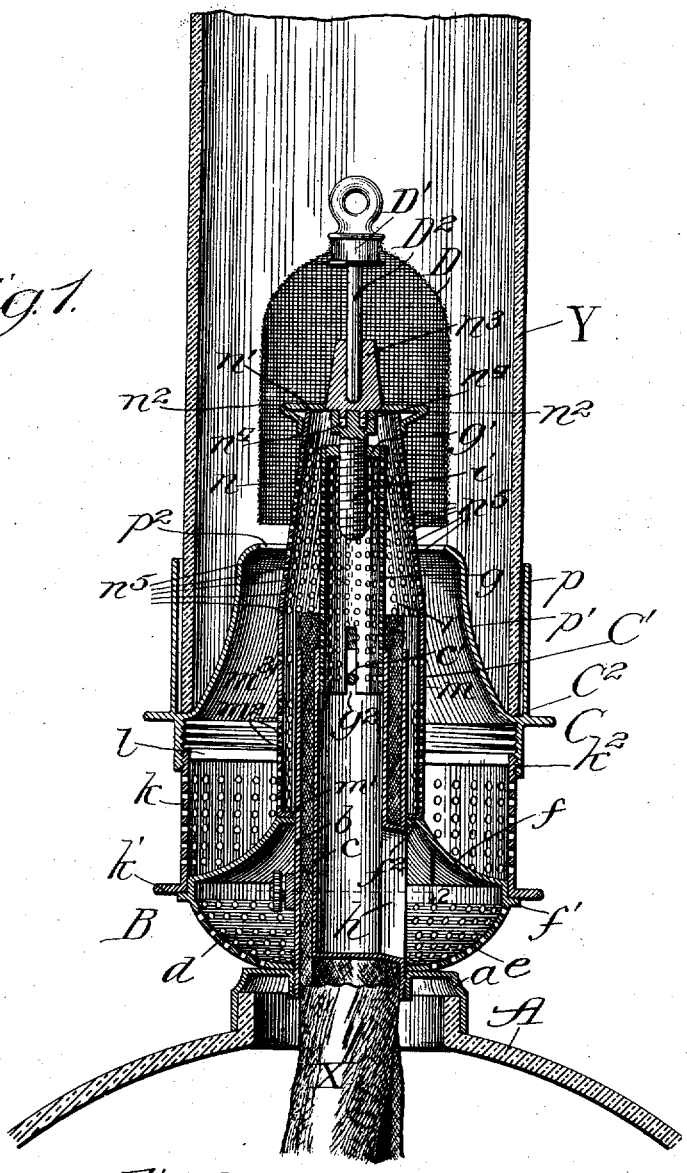
Figure 2:
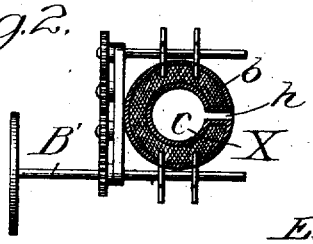

In the drawings, Figure 1 is a broken view showing my improved burner in vertical section, and Fig. 2 a plan section on line 2 in Fig. 1.

A is the font or oil-reservoir of a lamp, having the usual threaded burner-engaging collar $a$. The burner, as I prefer to construct it, is in two main readily-separable parts B and C. The lower part B consists of annular concentric tubes $b$ $c$, forming between them an annular tube or chamber for a wick X, a chamber or casing $d$ around and in fixed relation to the lower part of the tubes $b$ $c$, having a perforated cup-shaped base $e$ and imperforate frusto-conical top $f$ and an adjustable extension $g$. The tube $b$ is threaded along its lower end portion to enter and engage the collar $a$ and hold the part B firmly upon the lamp-body, and the inner tube $c$ forms a central draft-tube, closed at its base to the font or oil-reservoir. A narrow vertically-elongated passage $h$ extends between the chamber $d$ and the central draft-tube, and the wick is split to pass across the same. In the chamber $d$ and extending through the outer tube $b$ is wick raising and lowering mechanism B′ of common construction. On the casing $d$ is an annular seating-flange $f'$ and an annular seat $f^2$ around the tube $b$. The tube extension or vaporizing member $g$ is perforated throughout, as shown, and fits and slides along its lower end portion vertically in the draft-tube $c$. In the top of the tube extension $g$ is a plug $g'$, provided with a central threaded opening fitted with an adjusting-screw $i$. In the lower end portion of the tube extension $g$ is a vertical slot $g^2$, fitting over a pin $c'$ in the tube $c$, which prevents axial turning of the tube extension $g$ in the tube $c$. The upper removable part C of the burner comprises a perforated cylindrical wall $k$, having a base-flange $k'$ and threaded upper part $k^2$, a central tube C′, connected with the wall $k$ by a spider $l$ and a gallery $C^2$, screwed upon the threaded portion $k^2$ of the wall $k$. The tube C′ is formed with a cylindrical lower part $m$ and a frusto-conical upper part $n$. At the lower end of the part $m$ is an inner annular spacing-flange $m'$, which fits about the tube $b$ and rests upon the seat $f^2$, while the flange $k'$ rests upon the seat $f'$. At the top of the tube C′ is an imperforate cap $n'$, closing said top, formed with a spreader-flange $n^2$ and carrying a socket-piece $n^3$. On the under side of the cap $n'$ is a pair of downward-projecting pins or studs $n^4$, adapted to enter sockets $i'$ in the head of the screw $i$. The gallery $C^2$ has an outer wall $p$ to receive a chimney Y and an inward-projecting frusto-conical dome or hood $p'$. The perforated wall $k$ and dome $p'$ form an air-inlet chamber with an annular outlet $p^2$ at the top about the frusto-conical portion of the tube $c'$. The tube C′ forms the external wall of an annular mixing-chamber $r$ above the wick-tube $b$ and about the tube extension $g$. The tube C′ is provided along the lower part of the cylindrical portion $m$ with a series of perforations $m^2$, as shown, and also with an annular series of perforations $m^3$ adjacent to the top of the tube $b$. The frusto-conical portion $n$ of the tube C′, which constitutes the burner-head surrounding the tube extension $g$, is provided with a series of perforations $n^5$, forming the burner-openings.

D is an incandescent hood or mantle, which may be of what is known as the "Welsbach" type, mounted upon a supporting-head D′, having a central downward-extending stem $D^2$ fitting into the socket-piece $n^3$.

In practice the part C of the burner, which includes the parts $k$, C′, and $C^2$, is lifted from the part B to give access to the wick X. A match applied to the top of the wick ignites the oil, causing the flame from the wick to heat the inner tube extension or vaporizing member $g$ and wick-tube. These parts become sufficiently heated in about a minute's time, and the flame at the wick may then be extinguished, as by blowing it out. The part C is replaced, preferably, before extinguishing the wick, and the stored heat in the tube $g$ and wick-tubes $c$ $b$ has the effect of gasifying the oil rising to the top of the wick, and this gas rises in the mixing-chamber $r$ between the tubes C′ $g$ and escapes through the perforations $n^5$ of the tube C′ into the mantle D. A match is then applied to the mantle to ignite the gas as it escapes from the burner-openings $n^5$.

As the oil at the wick is volatilized it is met by a current of air passing through the perforations $m^2$ $m^3$ and by another current of air passing upward through the central draft-tube and escaping through the perforated tube extension $g$. It is also met by air entering through the lower perforations $n^5$ below the top of the hood $p'$. These air-currents entering from below and opposite sides of the mixing-chamber effect a thorough intimate mixing of atmospheric air with the hydrocarbon gas, resulting in a comparatively large volume of burning fluid. The air escaping upward through the passage $p^2$ tends to mix with and direct the fluid into the mantle in such a way that the products of combustion in the form of a blue flame of intense heat are directed into the mantle to render the latter incandescent approximately throughout. The flame extends from all the perforations $n^5$ above the opening $p^2$, and the tubes C′ $g$ are maintained at a temperature sufficiently high to gasify the oil as fast as it is brought to the top of the wick.

The supply of gas may be regulated by raising and lowering the wick, and the inner and outer air-currents may be regulated by raising or lowering the dome $p'$ upon the thread $k^2$ and by raising or lowering the inner tube extension $g$. To produce the best results, the inner and outer air-currents should balance, and this can be regulated for the most part by raising or lowering the tube $g$. When the part C is placed in position, the tube $g$ may be raised to the highest point in the tube $c$, and the pins $n^4$ on the cap $n'$ will enter the sockets $i'$ in the head of the screw $i$. If the air-current from the inner air-passage is found to be so strong as to unduly spread the flame, the tube $g$ may be lowered by turning the part C upon the part B in the direction which will cause the screw $i$ to lower the tube $g$. This lowering of the tube $g$ reduces the number of perforations above the wick-tube through which air from the central draft-passage can escape, and thus reduces the central draft. As before stated, the oil is ignited at the wick initially for a time long enough merely to heat the tube forming the inner wall of the mixing-chamber, the flame at the wick being then extinguished, so that during operation there is no flame in the mixing-chamber and only the single flame at the burner-head. Thus there is very little wear upon the wick, and it is too far below the flame at the mantle to be rapidly charred thereby.

While I prefer to construct my improvements throughout as shown and described, they may be variously modified in the matter of details of construction without departing from the spirit of my invention as defined by the claims.

What I claim as new, and desire to secure by Letters Patent, is—

1. In a single-flame hydrocarbon-oil burner, a wick, an air and vapor mixing chamber, a perforate burner-head remote from the wick and forming the gas-outlet from said mixing-chamber and at which the flame is obtained exteriorly of said chamber and which constitutes the vaporizing-heat generator, a vaporizing-tube in contact with the wick-surface and engaging with said burner-head to conduct heat from the latter to the wick for vaporization, and means for adjusting the wick.

2. In a single-flame hydrocarbon-oil burner, a wick, a burner-head at which the flame is obtained exteriorly, consisting of a perforate tube closed at its top, said head being remote from the wick and constituting the vaporizing-heat generator, an inner tube with which the wick is in contact and which is connected with the upper part of said head to conduct vaporizing heat to said wick, and means for adjusting the wick along said inner tube.

3. In a hydrocarbon-oil burner, a wick, a frusto-conical burner-head remote from the wick and at which the flame is obtained exteriorly and which constitutes the vaporizing-heat generator, and an inner cylindrical tube forming between it and the burner-head an air and gas mixing chamber, said inner tube being in contact with the wick and connected with said head to conduct heat from the latter to the wick for vaporization.

4. In a wick-fed hydrocarbon-burner, the combination of a wick, an air and vapor mixing chamber, a vaporizing-tube forming one of the walls of said chamber, a perforate burner-head remote from the wick engaging said tube and forming the gas-outlet from said mixing-chamber, said head also forming the vaporizing-heat generator, and wick-lift mechanism operating to slide the wick along said tube to regulate the volume of vapor produced.

5. In a burner to which hydrocarbon oil is fed by a wick, means serving to gasify the oil at the wick, mix air with the gas and burn the mixture remote from the wick, comprising, in combination, an annular mixing-chamber, into the lower part of which the wick extends, and having lower air-inlet and upper burner-openings, and a heat-conducting wall receiving its heat from the gas consumption at said burner-openings and along the lower part of which one side of the wick extends in slidably-adjustable surface contact.

6. In a liquid-hydrocarbon burner, a liquid-hydrocarbon-conducting wick arranged for temporary ignition to produce a flame for the generation of gas, a burner-head remote from the wick, means between the wick and burner-head for mixing air with said gas for subsequent consumption at said burner-head, and means for conducting a portion of the heat from the gas consumption at the burner-head to the upper portion of the extinguished wick for gas generation, comprising a heat-conducting wall along the lower part of which one surface of the wick extends in slidably-adjustable surface contact.

7. In a liquid-hydrocarbon burner, the combination of an air and gas mixing chamber, having a perforated external wall and an internal heat-conducting wall, said external wall forming the heat-generating portion of the burner, and a wick entering the lower part of said chamber.

8. In a liquid-hydrocarbon mantle-incandescing burner, the combination of an air and gas mixing chamber, having perforated external and internal heat-conducting walls, the upper part of said external wall forming the heat-generating portion of the burner surrounded by the mantle, and a wick entering the lower part of said chamber, substantially as set forth.

9. In a lamp, the combination with a liquid-hydrocarbon reservoir, of a mantle-incandescing burner having an air and gas mixing chamber with perforated external and internal air-inlet and heat-conducting walls, and a wick entering the lower part of said chamber from the reservoir, said external wall having burner-openings in its upper part, surrounded by the mantle, and forming the heat-generating portion of the burner, substantially as set forth.

10. In a lamp, the combination with a liquid-hydrocarbon reservoir, of a mantle-incandescing burner having a central draft-tube, an annular wick-tube surrounding said draft-tube, a perforated central-draft-tube extension forming the inner heat-conducting wall of a mixing-chamber above the wick-tube, a tube surrounding said wick-tube and said tube extension, forming an outer heat-conducting wall of said mixing-chamber closed at its upper end and having a lower series of air-inlet openings, and having an upper series of burner-outlets forming the heat-generating portion of the burner surrounded by the mantle, and an air-supply chamber, about said outer wall of the mixing-chamber, having a narrow annular draft-opening around the upper portion of said mixing-chamber, substantially as set forth.

11. In a lamp, the combination with a liquid-hydrocarbon reservoir of a mantle-incandescing burner having a central draft-tube, an annular wick-tube surrounding said draft-tube, a perforated central-draft-tube extension forming the inner heat-conducting wall of a mixing-chamber above the wick-tube, means for raising and lowering said draft-tube extension in said draft-tube, a tube surrounding said wick-tube and said tube extension, forming the outer heat-conducting wall of said mixing-chamber closed at its upper end and having a lower series of air-inlet openings, and having an upper series of burner-outlets forming the heat-generating portion of the burner surrounded by the mantle, and an air-supply chamber, about said outer wall of the mixing-chamber, having a narrow annular draft-opening around the upper portion of said mixing-chamber, substantially as set forth.

12. In a lamp, the combination with a liquid-hydrocarbon reservoir, of a mantle-incandescing burner having a central draft-tube, an annular wick surrounding said draft-tube, a perforated central-draft-tube extension forming the inner heat-conducting wall of a mixing-chamber above the wick-tube, a tube, having a cylindrical part surrounding said wick-tube, and a frusto-conical part surrounding said tube extension, forming the outer heat-conducting wall of said mixing-chamber closed at its upper end and having a lower series of air-inlet openings about the wick-tube and having an upper series of burner-outlets forming the heat-generating portion of the burner surrounded by the mantle, and an air-supply chamber about said outer wall of the mixing-chamber, having a narrow annular draft-opening around the upper portion of said mixing-chamber, substantially as described.

13. In a lamp, the combination with a liquid-hydrocarbon reservoir of a mantle-incandescing burner having a central draft-tube, an annular wick-tube surrounding said draft-tube, a perforated central-draft-tube extension forming the inner heat-conducting wall of a mixing-chamber above the wick-tube, a tube surrounding said wick-tube and said tube extension, forming the outer heat-conducting wall of said mixing-chamber closed at its upper end and having a lower series of air-inlet openings, and having an upper series of burner-outlets forming the heat-generating portion of the burner surrounded by the mantle, and an air-supply chamber about said outer wall of the mixing-chamber having a narrow annular draft-opening around the upper portion of said mixing-chamber with means for varying the size of said annular draft-opening, substantially as and for the purpose set forth.

14. In a lamp, the combination with a liquid-hydrocarbon reservoir, of a mantle-incandescing burner formed of two main readily separable and replaceable parts, one said part comprising a wick-tube, a central draft-tube surrounded by said wick-tube, a perforated tubular extension of said central draft-tube forming the inner air-inlet and heat-conducting wall of an annular mixing-chamber above the wick-tube, and the other said part comprising a central perforated tube forming the outer air-inlet and heat-conducting wall of said mixing-chamber, a chamber about said central tube having a perforated cylindrical outer wall, a frusto-conical hood forming a narrow draft-opening about said central perforated tube, an imperforate cap at the top of said central perforated tube provided with a spreader-flange, a socket-piece on said cap, a mantle-support mounted in said socket-piece, and a mantle upon said support, all constructed and arranged to operate substantially as set forth.

ELLSWORTH E. FLORA.

In presence of—

WALTER N. WINBERG,

L. HEISLAR.